May 4, 1926.
V. H. ALEY ET AL
1,583,331
WRENCH
Filed May 29, 1925
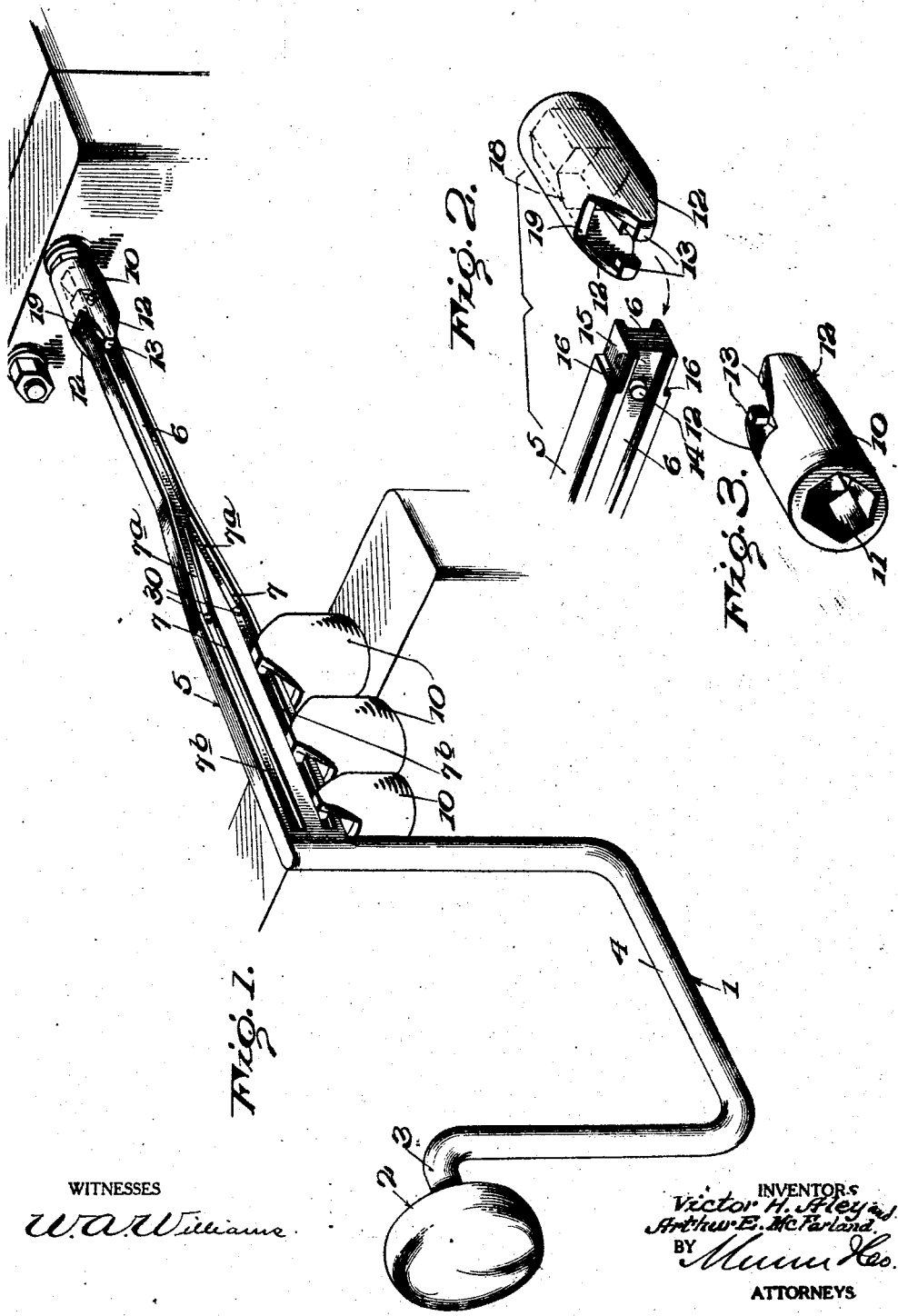

Patented May 4, 1926.

1,583,331

UNITED STATES PATENT OFFICE.

VICTOR H. ALEY AND ARTHUR E. McFARLAND, OF WILSON, OKLAHOMA.

WRENCH.

Application filed May 29, 1925. Serial No. 33,697.

*To all whom it may concern:*

Be it known that we, VICTOR H. ALEY and ARTHUR E. MCFARLAND, citizens of the United States, residing at Wilson, in the county of Carter, State of Oklahoma, have invented certain new and useful Improvements in Wrenches, of which the following is a specification.

This invention relates to an improvement in socket wrenches of the type having a plurality of working heads of various types or sizes adapted to be selectively brought into use in order to effectively engage and co-act with the nut or other object to be turned or actuated.

The object of the invention resides in the provision of a wrench of this character wherein the working head in use is firmly, rigidly and positively connected to the operating means of the wrench and yet easily and readily shiftable to an inoperative position to provide for the bringing of a different style or size of working head into position for use.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a preferred embodiment of the invention,

Figure 2 is a fragmentary view in perspective illustrating the forward end of the shank of the wrench and one of the working heads, Figure 3 is a detail perspective view of the working head.

Referring to the drawings the numeral 1 designates generally the operating means of the wrench and as shown comprises a hand grip 2 swiveled to one end of a bar 3 which has a crank 4 provided therein to facilitate turning of the wrench. A shank 5 is connected to the opposite arm of the crank from that to which the hand grip 2 is swiveled and this shank 5 takes the form of a flat bar. Each side face of the bar making up the shank 5 has a main groove or channel 6 therein which extends out through the forward end of the shank and which communicates with spaced branch slots 7 extending rearwardly to a point adjacent the crank 4. Each slot 7 has an inclined portion 7$^a$ and a straight portion 7$^b$ and the walls of the inclined portions 7$^a$ of the slots 7 provide tighteners for the working heads as will hereinafter more clearly appear.

A plurality of working heads, designated generally at 10, and of different sizes, type or style, are provided. Each working head has a socket 11 formed with working faces adapted to engage the nut, bolt heads or other objects to be turned or held. Rearwardly extending arms 12 are integrally formed with the body of each working head and at their ends these arms 12 have inturned lugs 13.

In assembling the working heads on the shank 5 the lugs 13 are introduced into the slots 6 and then passed down into either one of the slots 7. After the working heads have been assembled in this manner on the shank 5, a transversely extending pin 14 is fastened to the forward end of the shank and has portions projecting into the opposite slots 6. The pin may be a driving fit in a suitable opening in the forward end of the shank 5 or may be otherwise secured in position. In this way the working heads are permanently mounted on the shank and yet any one of the working heads may be selected and brought into driving engagement with the forward end of the shank as will be hereinafter more fully described.

The forward end of the shank 5 is reduced, as indicated at 15, and at the juncture of the reduced end and the main portion of the shank shoulders 16 are presented. The reduced end 15 is adapted to snugly fit in a correspondingly formed seat 18 provided in each of the working heads rearwardly of the socket 11 thereof. When the reduced end 15 is engaged in the seat 18 of any working head, such working head is constrained to partake of the turning movement of the shank 5 so that such working head is positively connected to the shank. This driving engagement results from the feature of having the reduced forward end of the shank of non-circular cross section and of having the seat 18 in the working head of corresponding form. Moreover, rearward movement of such working head on the shank is prevented by virtue of the fact that each working head has flat walls or surfaces 19 formed thereon which are engageable with the shoulders 16 of the shank.

With this arrangement quite a number of working heads may be provided on each wrench and any of them may be quickly brought into operative position by simply shifting the heads not used into one or the other of the slots 7, and positioning the working head to be used on the reduced end 15 of the shank 5.

In order to releasably hold the working heads when not in use in the rear straight portion 7o of the slot 7 spring projecting retaining balls 30 are provided at the juncture of the portions 7a and 7b of the slots 7. The lugs 13 are adapted to depress these pawls and to ride over the same when the working heads are manually shifted but the pawls are effective to prevent accidental displacement of the working heads from the portions 7b of the slots.

We claim:—

1. A socket wrench including operating means having a shank provided with a main slot on each of its side faces and a pair of branch slots on each of its side faces communicating with the main slot thereof, a plurality of working heads mounted on the shank, each working head having inturned lugs slidably engaged with the walls of the slots, the forward end of the shank being reduced and of polygonal form, the working heads having seats adapted to snugly receive the working head to provide a driving connection between any one of the working heads and the shank.

2. A socket wrench including a shank having in each side face a main slot leading out through the forward end of the shank and having a pair of branching slots in each side face communicating with the rear end of the main slot thereof, a plurality of working heads, each working head having a pair of arms provided with inturned lugs slidably fitted in the slots, a pin connected with the forward end of the shank and having portions projecting into the main slot to prevent the working heads from falling off of the shank, the working heads having rearwardly disposed seats, and means at the forward end of the shank adapted to co-act with such seats to provide a driving connection between any working head and the shank.

3. A socket wrench including operating means having a shank provided with a main slot on each of its side faces and a pair of branch slots on each of its side faces communicating with the main slot thereof, said slots being adapted to have their walls slidably engage with inturned lugs on a plurality of working heads, and means at the forward end of the shank adapted to co-act with any selected one of the working heads for positively driving the selected working head from the shank.

4. A socket wrench including a shank having means extending along the same adapted to be slidably interengaged with a plurality of working heads for permanently holding the working heads on the shank, said shank having means at its forward end adapted to co-act with any selected one of the working heads for positively driving the selected working head from the shank without removing any of the working heads from the shank.

5. A socket wrench including operating means provided with a main slot on each of its side faces and a pair of branch slots on each of its side faces communicating with the main slots thereof, said slots being adapted to have their walls slidably engaged with inturned lugs provided on each of a pair of working heads, said shank having its forward end of non-circular cross section and having shoulders at the juncture of said forward end and the main portion of the shank, said forward end and said shoulders being adapted to co-act with parts of any selected one of the working heads for driving the selected working head.

VICTOR H. ALEY.
ARTHUR E. McFARLAND.